United States Patent [19]
Hoglund

[11] 3,800,621
[45] Apr. 2, 1974

[54] CAM CONTROL GRINDING MACHINE
[75] Inventor: Nils O. Hoglund, Short Hills, N.J.
[73] Assignee: Tri-Ordinate Corporation, Berkeley Heights, N.J.
[22] Filed: Mar. 22, 1972
[21] Appl. No.: 237,175

Related U.S. Application Data
[60] Division of Ser. No. 164,406, July 20, 1971, Pat. No. 3,663,188, which is a continuation-in-part of Ser. No. 147,145, May 26, 1971.

[52] U.S. Cl.................. 74/567, 51/101 R, 74/569, 82/1.3
[51] Int. Cl............................................ F16h 53/00
[58] Field of Search ............ 74/567, 569, 206, 208; 51/101 R; 82/1.3

[56] References Cited
UNITED STATES PATENTS
2,902,871  9/1959  Mooar.............................. 74/206 X
3,434,370  3/1969  Scholl et al......................... 74/569
3,435,563  4/1969  Reaser............................. 51/101 R

OTHER PUBLICATIONS
Rothbart, Harold A., Cams, Design, Dynamics, and Accuracy, N.Y., John Wiley & Sons, Inc., 1956, pp. 173-175. TJ206R6C2.

Primary Examiner—Samuel Scott
Assistant Examiner—F. D. Shoemaker
Attorney, Agent, or Firm—Pennie & Edmonds

[57] ABSTRACT

A cam-cam follower system having a cam with a curved surface. A cam follower engages the cam at a position lying in a predetermined plane normal to the surface at that position. Drive elements move the surface through the position while guide follower elements maintain the surface normal to the predetermined plane.

9 Claims, 8 Drawing Figures

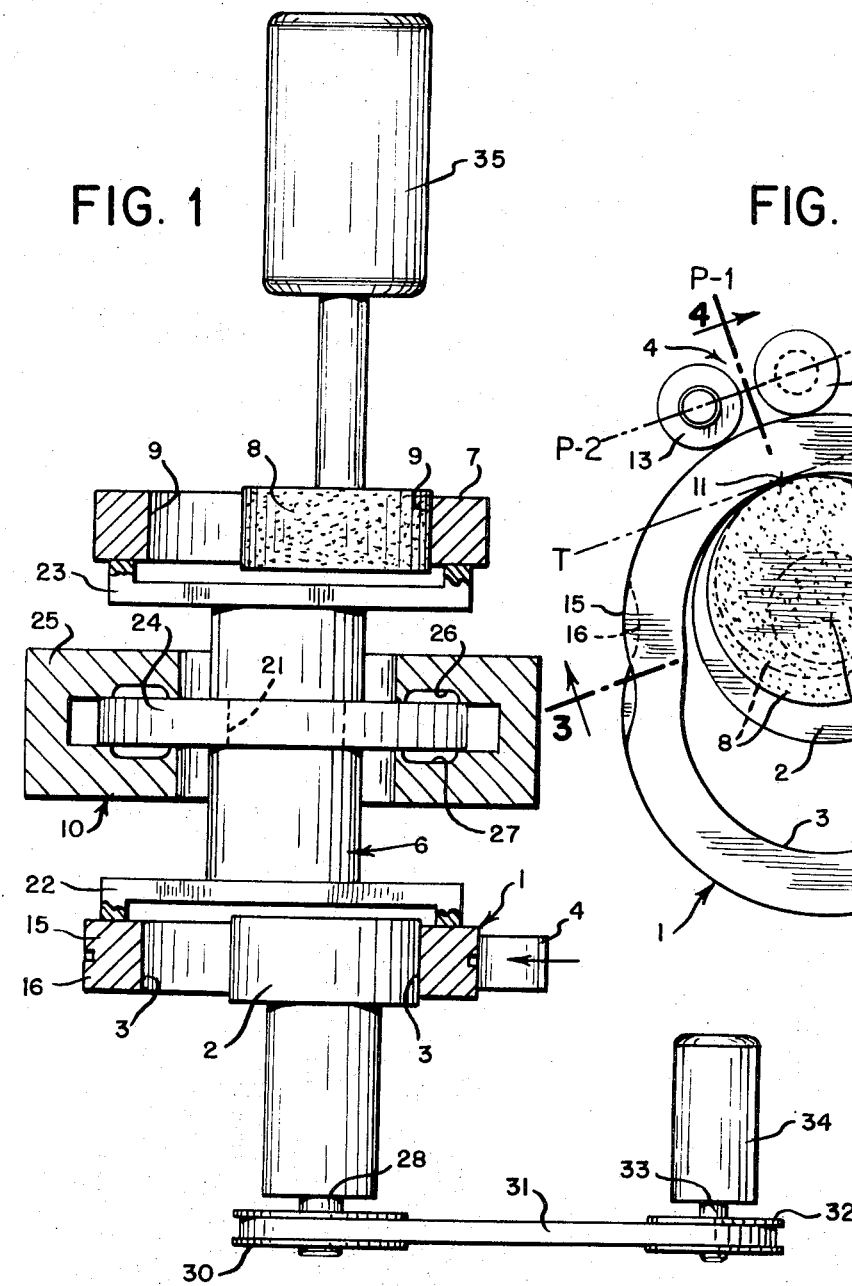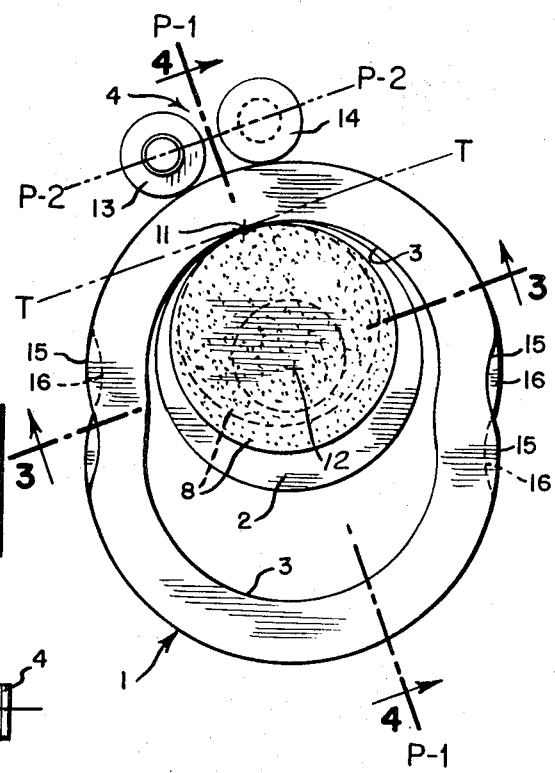

CAM CONTROL GRINDING MACHINE

RELATED APPLICATION

This application is a divisional application of application Ser. No. 164,406, filed July 20, 1971, now U.S. Pat. No. 3,663,188. Application, Ser. No. 164,406, is, in turn, a continuation-in-part application of my application Ser. No. 147,145, filed May 26, 1971, entitled CAM CONTROL GRINDING MACHINE and now abandoned.

BACKGROUND OF THE INVENTION

In manufacturing structural elements such as metal machine parts, it is often necessary that the element have a finished surface of particular design and shape. As an example, machine elements which are adapted to cooperate in a sliding, gearing or camming relation must have cooperating surfaces of precise shape. Where these surfaces are straight, circular, or of some other common shape, the machining or surfacing is not too difficult. Where, however, the desired surface of the element is a complicated curve, as for example, one having an ever changing radius of curvature, the machining thereof becomes both difficult and expensive.

If the desired surface is an external one, a lathe or similar cutting machine may be used. Also, where tolerances are not of critical importance, a milling machine may be used. A milling machine is advantageous in that it can mill both external and internal surfaces on a workpiece.

Where tolerances are critical, a grinding machine is usually employed. Grinding machines can produce extremely accurate surfaces; but when these surfaces are of unusual shape, the expense of constructing the machine to perform the particular grinding operation is often prohibitive. It may, for example, take a number of separate grinding operations to produce a particular complex surface with each of the grinding operations requiring that the workpiece be fed through a separate grinding machine. Also, with presently available grinding machines, the feeding of the workpiece relative to the grinding wheel is difficult to control both with regard to its direction of movement and rate of feed past the grinding wheel. Different sized grinding wheels generally require that the workpiece be fed through different paths in order to produce the same surface. Similarly, as the grinding wheel becomes worn during a grinding operation, adjustments in the direction of movement of the workpiece must be made in order to maintain the desired surface cut. This is especially true where a curved surface is desired. In addition to the problems encountered with different sized grinding wheels, any changes in rate of feed of the workpiece relative to the grinding wheel adversely affects both efficiency of operation and the quality of the finished surface. Different grinding rates produce different surface finishes. This, in turn, necessitates further processing of the workpiece to obtain uniformity.

SUMMARY OF THE INVENTION

In accordance with the teachings of the present invention, applicant has provided an improved grinding machine for grinding to extremely accurate dimensions both external and internal surfaces. Applicant's machine is particularly suited for grinding internal surfaces as, for example, the internal cavity of the stator part of a Wankel type engine.

The cavity surface of the Wankel type engine is roughly eliptical but since it is not truely eliptical, extreme difficulties have been encountered in producing the surface economically on a production line basis. At best, multiple grinding and polishing operations are required to produce an acceptable part. Without a precision ground and finished surface, wear caused by the internally driven rotor engaging against this surface occurs rather rapidly. Also, the functioning of the engine is adversely affected by an improper mating of the rotor with the cavity wall surface of the stator.

These disadvantages as they pertain both to the manufacturing and maintenance of the engine have been a factor in the non-acceptance of this type of engine on a commercial basis in mass produced automobiles. The Wankel type engine does, however, have great potential advantages. It is a simple, compact and yet powerful engine. Also, where the internal cavity wall surface of the stator is accurately machined, efficiency of operation is high. Of great importance, especially with todays concern about ecology, is that the Wankel type of engine provides a great potential for reducing pollution of the environment. To attain all of these advantages, however, it is essential that the cavity wall surface be a precision surface and one which can be made economically on a mass production basis.

In construction, the grinding apparatus of the present invention includes an annular cam member, one surface of which is identical to the surface of the workpiece to be ground. Where the workpiece comprises the stator of the Wankel type engine, the internal surface of the cam member is polished to a contour identical to the internal wall cavity desired for the stator. The workpiece is fixed relative to the cam member for movement through a path corresponding to the contoured surface of the cam member. A grinding wheel engages the surface of the workpiece as it is fed along the desired path to perform the grinding operation. To effect movement of the workpiece through the desired path, a drive follower engages against the contoured surface of the cam member with the engagement thereof effecting movement of the cam member as the drive follower is rotated.

In accordance with the teachings of the present invention, the axis of rotation of the drive follower is maintained in a plane extending perpendicular to the surface of the cam member as it passes through a fixed point. The grinding wheel is also mounted with its axis of rotation disposed in this same plane and urged in this plane toward the surface of the workpiece to be ground. Upon rotating the drive wheel at a constant speed, the cam surface will be fed at a constant rate through the point of engagement with the drive follower. This, in turn, will move the surface of the workpiece to be ground past the grinding wheel at a constant rate and thus effect removal of material at a constant rate during the grinding operation. Also, due to the mounting of the grinding wheel with its axis of rotation in a plane perpendicular to the surface it is grinding, wear of its grinding surface with the resultant decrease in diameter will not effect the grinding operation. Even grinding wheels of different diameters may be used without effecting the grinding operation and without causing any deviation from the prescribed contour desired.

BRIEF DESCRIPTION OF THE DRAWINGS

FIG. 1 is a schematic view of the grinding apparatus of the present invention;

FIG. 2 is a schematic view of the cam and cam follower drive means of the present invention;

DESCRIPTION OF THE PREFERRED EMBODIMENT

Figure 3:
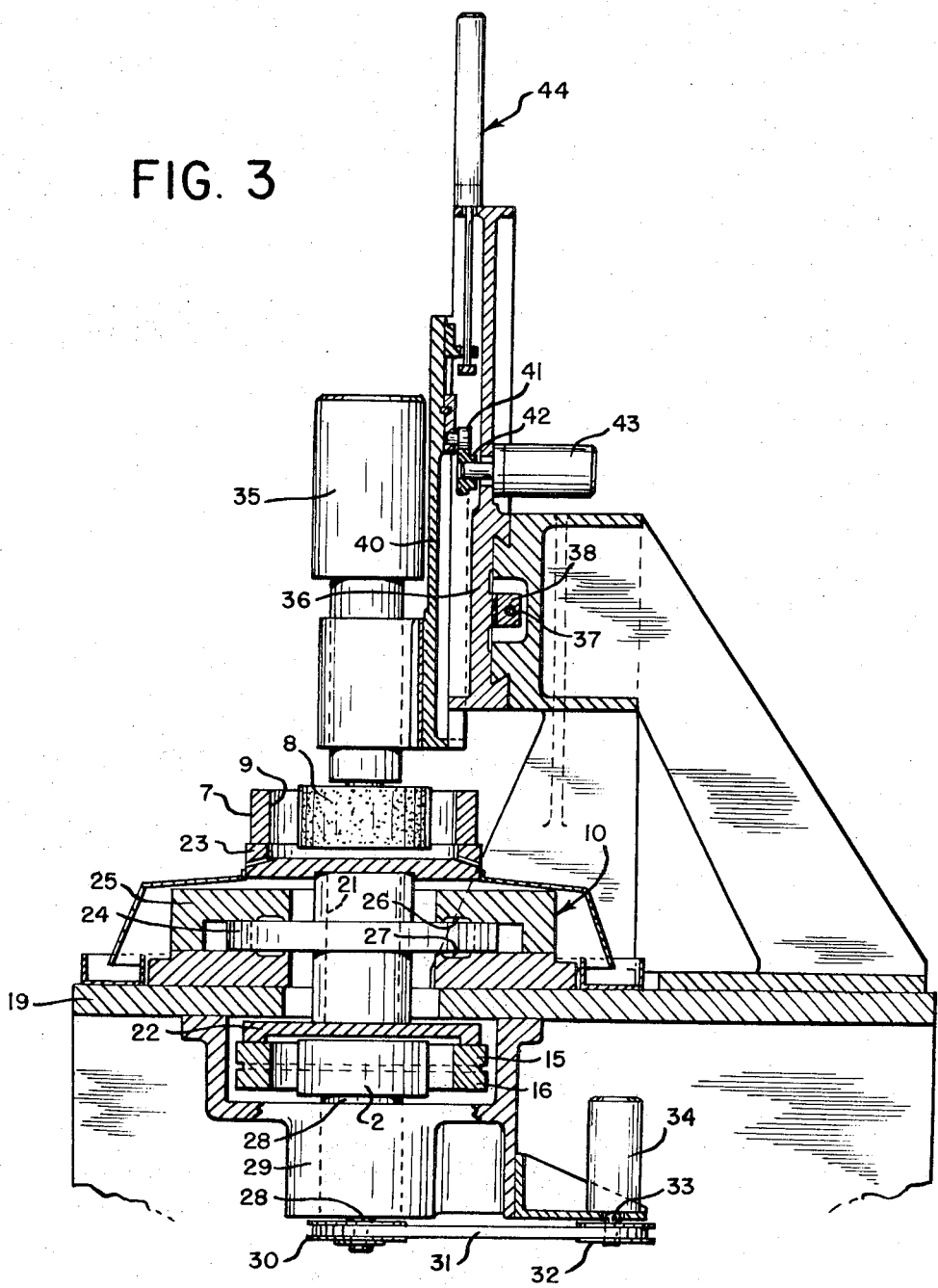
FIG. 3 is a cross-sectional view of the grinding apparatus of the present invention as viewed through lines 3—3 of FIG. 2.

As shown in FIG. 1, the grinding apparatus of the present invention includes an annular cam member 1. A cam drive follower 2 engages against the internal surface 3 of the cam member and a cam guide follower means 4 engages against its external surface to urge it into contact with the follower 2. Support means 6 are provided for mounting the cam member at one end thereof and for holding the workpiece 7 at the other end. A grinding wheel 8 engages against the internal surface 9 of the workpiece. To permit movement of the cam along a path corresponding to a surface 3, the support means 6 is mounted within bearing means 10. Movement of the cam member effects a similar movement of the workpiece past the grinding wheel.

In the particular embodiment of the invention disclosed, the cam member 1 is constructed with an internal surface 3 corresponding to the cavity wall surface of the stator of a Wankel type engine. This shape is most clearly shown in FIG. 2. The cam drive follower 2 engages against the internal surface of the cam at the position 11. At this position, the drive follower and the internal surface of the cam are tangent to each other. This tangent is represented by the line T. A plane P-1 extends normal to the tangent and through the point 11. This plane also extends normal to the surface 3 of the cam at the position 11.

In accordance with the teachings of the present invention, the cam drive follower 2 is mounted with its axis of rotation 12 lying in the plane P-1. Also, the cam guide follower means 4 engaging against the external surface of the cam member includes a pair of follower wheels 13 and 14. These wheels are mounted with their axes of rotation disposed in a plane P-2 perpendicular to the plane P-1. The guide follower means is urged against the cam follower to produce a resultant force lying in the plane P-1 and extending through the position 11.

The external surface of the cam member includes upper and lower tracking sections 15 and 16 for cooperating respectively with the follower wheels 13 and 14. The follower wheels are, themselves, mounted on a slide member 17. The slide member is contained within a housing 18 secured to the machine bed 19 by suitable means. The slide member 17 is spring biased by spring means 20 to urge the entire slide, in the plane P-1 toward the position 11. In this way, the wheels 13 and 14 are pressed against the respective tracking sections 15 and 16 of the cam member to hold the cam member against the drive follower 2.

As shown in FIG. 2, the upper and lower tracking sections of the cam member are of different contour. The precise contour of each of the tracking sections is dictated by the surface 3. Along the sides, the surfaces are clearly shown as undercutting each other opposite the portions of the internal surface 3 which become convex as opposed to concave. The differences in shape between the tracking sections as shown in FIG. 2 is due to the fact that a pair of offset guide wheels are used rather than a single wheel. With a pair of wheels, they will contact different peripheral position on the tracking sections at any given point in time as the cam member is moved.

Where the cavity wall surface of the stator of a Wankel type engine is being ground, the surface will be one having an ever changing radius of curvature. Also, since the follower wheels are offset, the tracking sections will differ in shape over their entire periphery. The difference in shape is small, and except for the undercut sides, is not shown in FIG. 2.

The support means for holding the cam member comprises a spindle 21. Attached to the lower end of the spindle is a support 22 to which the cam member is bolted. The upper end of the spindle has another support 23 to which the workpiece 7 is attached for the grinding operation. The spindle is free to rotate about its longitudinal axis and is also free to move laterally during this rotation along a path as dictated by the internal surface 3 of the cam member. For this purpose, the spindle includes a circular bearing plate 24 attached to the spindle intermediate its ends. The peripheral portion of the bearing plate is disposed within a housing 25. The housing includes a plurality of upper and lower pockets 26 and 27 facing the opposite sides of the bearing plate.

In the presently preferred embodiment of the invention, the pockets are supplied with air pressure to act against the opposed sides of the bearing plate in the housing 25. The sizes of the upper and lower pockets can be dimensioned and/or the air pressure regulated to compensate for the weight of the spindle and attached structure to effect this floating relation. Alternatively, hydraulic pressure may be provided. Also, air pressure may be supplied against the underside of the bearing plate and oil provided for maintaining a sliding relationship of the upper side of the plate with the opposed wall of the housing. With either type of construction, a thrust bearing effect is produced which permits rotation of the spindle and lateral movement in a plane perpendicular to its axis of rotation with a minimum amount of friction.

For moving the workpiece past the grinding wheel to effect a grinding operation, the cam member is fed between the drive follower and guide followers with the internal contoured surface 3 passing progressively through the point 11. For this purpose, the drive follower is supported on an end of a shaft 28 held within a bearing housing support 29. The other end of the shaft is provided with a pulley 30 around which a drive belt 31 extends. The drive belt also loops around a pulley 32 fixed to the output shaft 33 of a drive motor 34. A constant speed motor is used for effecting a constant rate turning of the drive follower.

As the drive follower is rotated, its engagement with the internal surface of the cam member causes feeding of the cam member. The guide follower means 4 acting on the cam member holds the cam member relative to the drive follower so that the position 11 remains fixed. Also, the internal surface of the cam member will always lie along the tangent T when at position 11 and thus be perpendicular to the plane P-1. With a constant rate of turning of the drive follower 8, the surface 3 will be fed through the position 11 at a constant rate.

The use of a pair of guide follower wheels disposed on opposite sides of the plane P-1 efficiently overcomes inertial forces tending to cause the cam member to rotate around the drive follower and thus shift the point 11 out of the plane P-1. A single guide wheel having its axis of rotation in the plane P-1 can be used as more fully described hereafter; but a single wheel requires considerable more force to overcome the tendency of the cam member to rotate about the cam follower.

In accordance with the teachings of the present invention, the grinding wheel 8 is mounted with its axis of rotation disposed in the same plane P-1 as is the axis of rotation of the drive follower 2. In addition, while the axis of rotation of the drive follower is fixed in the plane P-1, the grinding wheel is free to move in this plane toward and away from the surface 9 of the workpiece.

The grinding wheel together with its associated drive motor 35 is mounted on a slide 36. A lead screw 37 extends parallel to the plane P-1 and threadedly through a nut member 38 attached to the slide. A stepping motor 39 is provided for rotating the lead screw. Rotation of the lead screw, in turn, effects movement of the slide and the grinding wheel in the plane P-1.

With the axis of rotation of the grinding wheel fixed for movement within the plane P-1, any change in size of the grinding wheel or wear of its cutting surface will not effect the grinding operation. This is most clearly shown in FIG. 2 where grinding wheels of different size are shown at dotted lines at 8. Their position of engagement with the workpiece will always correspond to the position 11 at which the cam drive follower engages the internal surface of the cam member. As evident from FIG. 2, the size of the grinding wheel will not change the shape of the surface being ground since this surface will always lie perpendicular to the plane P-1 at position 11.

Also, with the movement of the workpiece being fixed relative to the cam member, a feeding of the cam surface 3 past the position 11 at a constant rate will produce a constant rate of feed of the workpiece past the grinding wheel. This, in turn, will assure that the surface of the workpiece to be ground will have a uniform surface finish. This constant rate of feed will also provide for a more efficient grinding operation and less wear of the grinding wheel.

During the grinding of the internal surface of the workpiece, the grinding wheel is advantageously reciprocated vertically. For this purpose, a vertically movable slide 40 connects the grinding wheel to the slide 36. The slide 40 is adapted to move vertically along the slide 36 under the influence of a cam follower mechanism shown in FIG. 3. More particularly, the slide 40 is provided with a follower wheel 41 engaging against a cam 42. The cam 42 is fixed to the end of the output shaft of a motor 43. Rotation of the shaft causes rotation of the cam 42. The surface of the cam which engages the follower 41 is suitably shaped, for example, by being eliptical, so as to cause the desired vertical reciprocation of the slide 40.

The mounting of the grinding wheel on a vertical slide is also advantageous in permitting raising of the grinding wheel to facilitate insertion and removal of the workpiece on the support 23. To lift the slide upwardly, a hydraulic cylinder and piston 44 is provided.

In operation of the grinding machine, the particular cam member having the contoured surface corresponding to that desired on the workpiece is attached to the support 22. With the grinding wheel raised, the workpiece is secured to the support 23. The grinding wheel is then lowered into the workpiece. Rotation of the drive follower effects feeding of the cam member along a path corresponding to its contoured surface. A similar movement of the workpiece is produced; and the stepping motor 39 is employed to feed the grinding wheel into the workpiece. The surface of the workpiece is ground with the stepping motor being used to regulate the amount of grinding on each pass of the workpiece until the finished size corresponding to the cam surface of the cam member is obtained.

Figure 4:
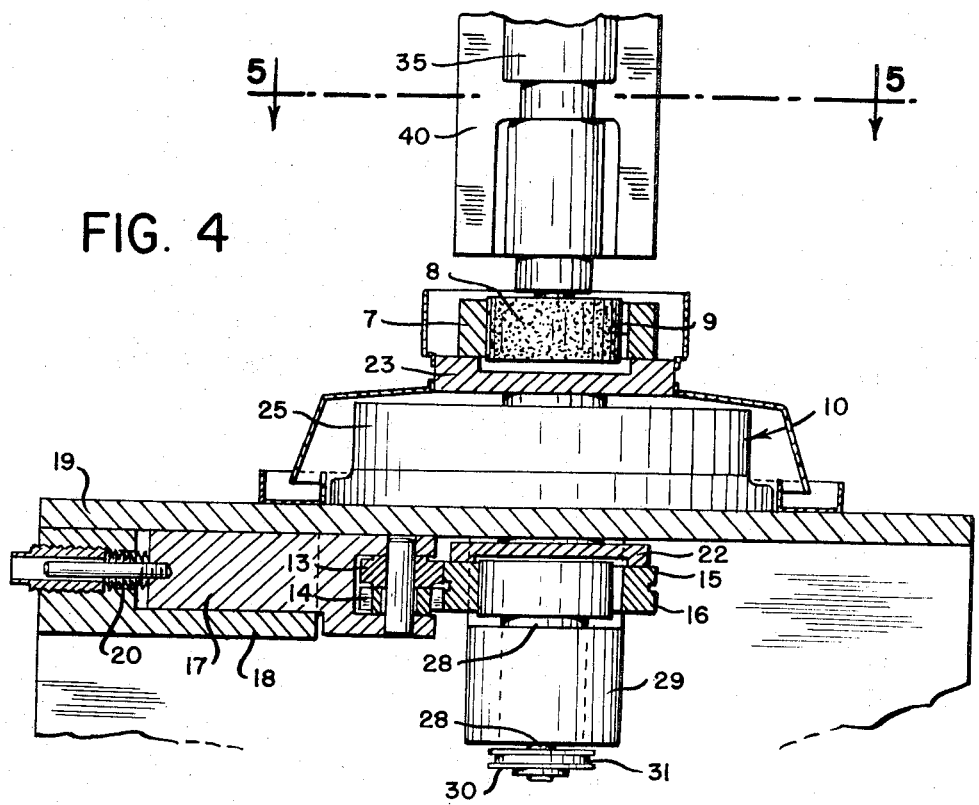
FIG. 4 is a cross-sectional view of the grinding apparatus as viewed through lines 4—4 of FIG. 2.
Figure 5:
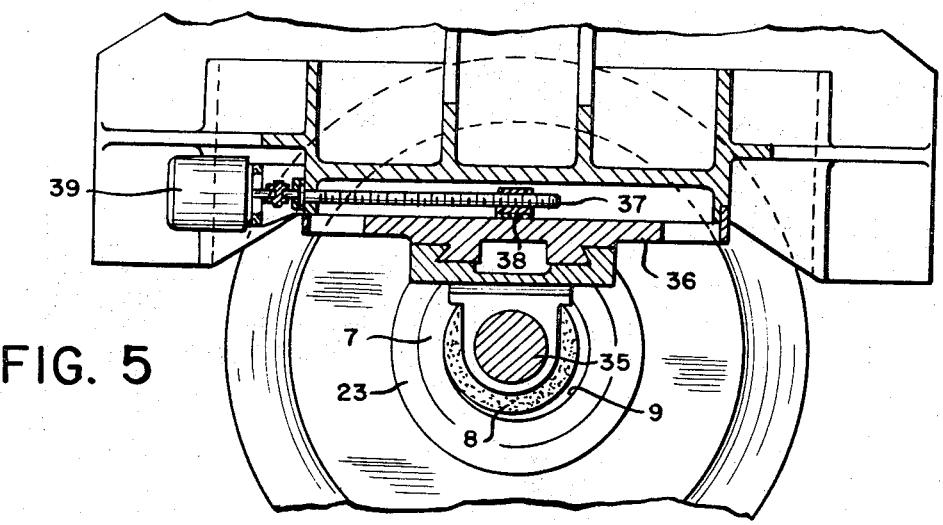
FIG. 5 is a cross-sectional view taken along lines 5—5 of FIG. 4.
Figure 8:
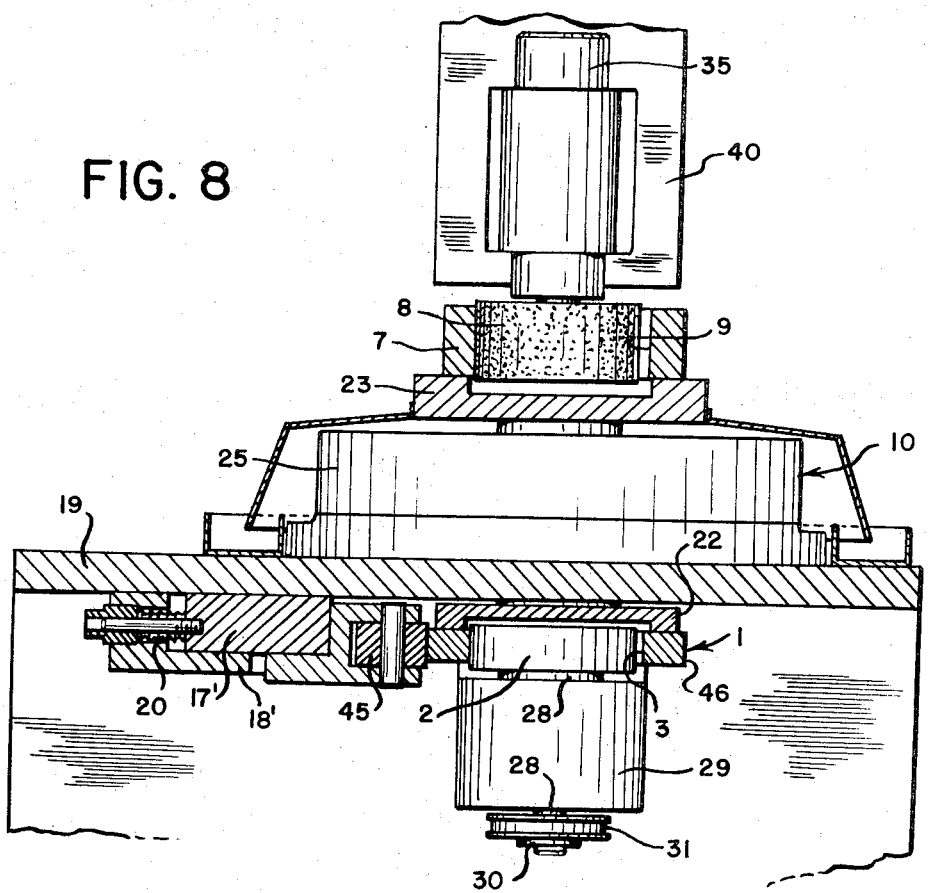
FIG. 8 is a cross-sectional view of the alternative embodiment of the grinding apparatus as viewed through lines 8—8 of FIG. 6.
Figure 6:
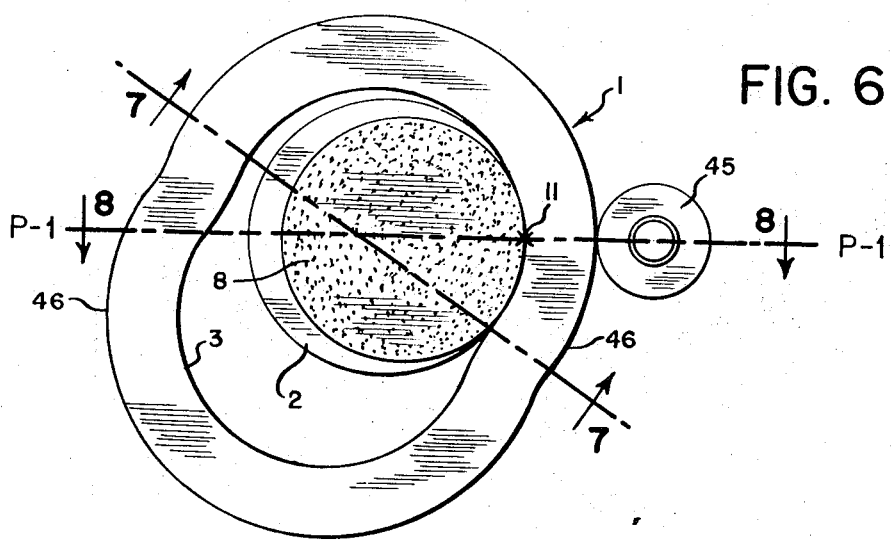
FIG. 6 is a schematic view of the cam and cam follower drive means of an alternative embodiment of the grinding apparatus of the present invention.
Figure 7:
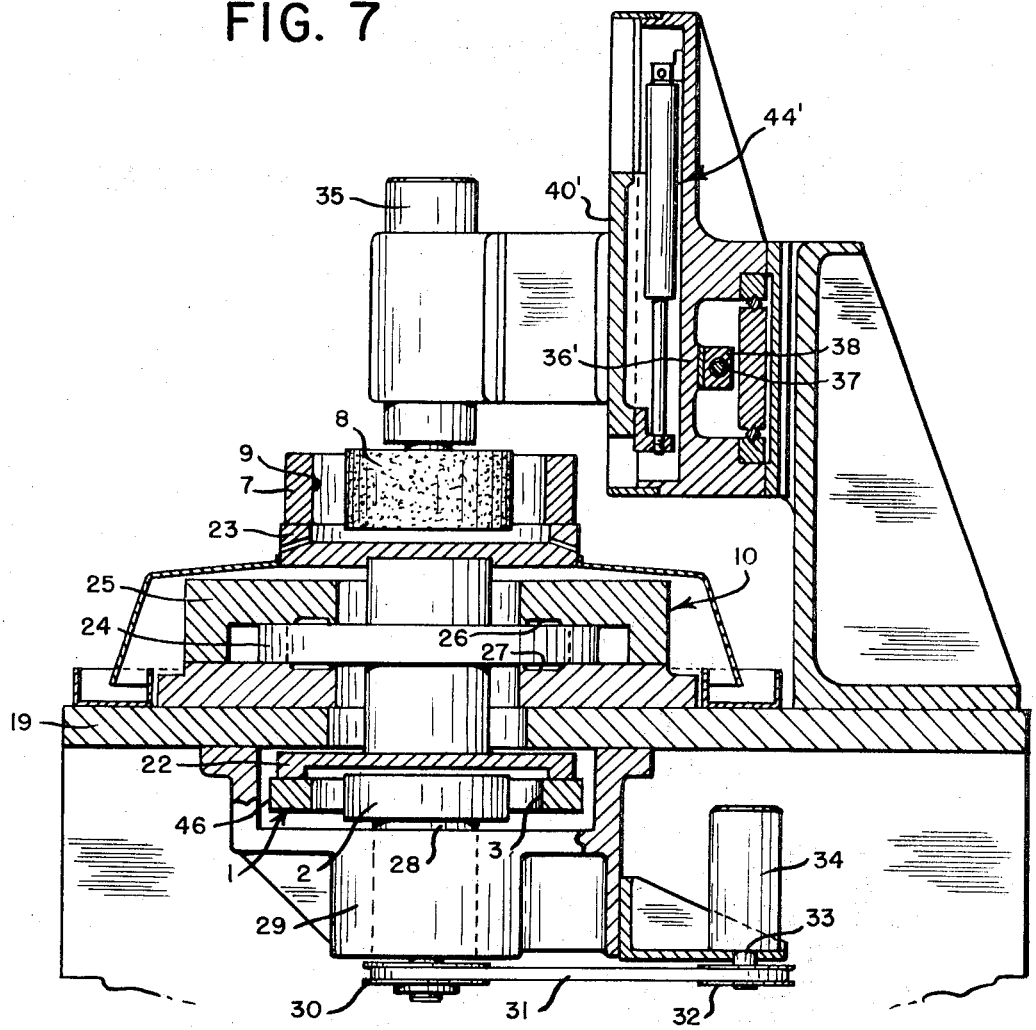
FIG. 7 is a cross-sectional view of the alternative embodiment of the grinding apparatus as viewed through lines 7—7 of FIG. 6.

As shown in FIGS. 6–8, the grinding machine may be constructed for use with a single guide wheel engaging the outer surface of the cam member. The structure shown in FIGS. 7 and 8 is generally the same as shown in FIGS. 3 and 4 except for the cam follower arrangement. Accordingly, like parts are designated by like reference numerals while similar parts having identical functions are designated by the same reference numeral as used in FIGS. 3 and 4 followed by the suffix prime (').

When the cam guide follower means 4 is comprised of a single wheel 45, the outer surface of the cam 1 will have a single tracking section 46. The surface defined by this section will extend parallel to the internal surface 3 of the cam. With the use of a single wheel as opposed to two wheels, the relationship between the cam drive follower 2, cam 1 and cam guide follower 45 is the same as with the construction shown in FIG. 2. More particularly, the cam drive follower 2 will have its axis of rotation in the plane P-1 extending normal to the tangent through the position 11 at which the cam drive follower engages the internal surface of the cam 1. The axis of rotation of the wheel 45 will also lie in the plane P-1 and the wheel will be urged against the cam follower to produce a resultant force lying in this plane and extending through the position 11. The mechanism for urging the wheel 45 against the cam is shown in FIG. 8 as being the same mechanism used in the construction of FIG. 4.

Although the invention is described above with respect to grinding an internal surface, it is to be understood that the grinding apparatus of the present invention is also suited for grinding external surfaces. In such case, the cam member will be provided with an external surface corresponding to the desired surface to be ground on the workpiece. The drive follower will engage against the external surface of the cam member with the guide followers moving along its internal surface.

I claim:

1. A cam member for use in a cam-cam follower system for movement through a path lying in a first plane, said cam member having:
   a. a first closed curved surface adapted to be engaged by a cam follower at a position lying in a second plane extending normal to said first surface at said position; and
   b. a second closed curved surface facing in a direction opposite to said first surface and including:
      1. first and second tracking sections disposed at different locations in a direction extending perpendicular to said first plane for engagement separately by two guide follower members disposed on opposite sides of said second plane, said two tracking sections being contoured relative to the first surface for progressively directing said first surface through said position as the cam member is moved through said path and between said cam follower and said guide follower members and for maintaining said first surface normal to said second plane as it passes through said position.

2. A cam member according to claim 1 having an annular shape wherein:
   a. the first surface defines the inner surface of the annular shape; and
   b. the second surface defines the outer surface of the annular shape.

3. A cam member according to claim 2 wherein:
   a. said second plane is perpendicular to said first plane.

4. A cam member for use in a cam-cam follower system for movement through a path lying in a first plane, said cam member having:
   a. a first curved surface adapted to be engaged by a cam follower at a position lying in a second plane extending normal to said first surface at said position; and
   b. a second curved surface facing in the direction opposite to said first surface and including:
      1. first and second tracking sections disposed at different locations in a direction extending perpendicular to said first plane for engagement separately by two guide follower members disposed on opposite sides of said second plane, said two tracking sections being contoured relative to the first surface for progressively directing said first surface through said position as the cam member is moved through said path relative to and between said cam follower and said guide follower members and for maintaining said first surface normal to said second plane as it passes through said position.

5. A cam-cam follower system comprising:
   a. a cam having a first curved surface and a second curved surface facing in the direction opposite to said first surface and including first and second tracking sections;
   b. a cam follower engaging the first curved surface at a position lying in a predetermined plane extending normal to the first surface at said position;
   c. separate guide follower members engaging separately against the first and second tracking sections, said members being disposed on opposite sides of said predetermined plane and said two tracking sections being contoured relative to the first surface for progressively directing said first surface through said position as the cam member is moved relative to the cam follower and guide follower members for maintaining said first surface normal to said pre-determined plane as it passes through said position; and
   d. drive means for effecting movement of the cam relative to and between said cam follower and guide follower members.

6. A cam-cam follower system according to claim 5 further comprising:
   a. means for urging said follower members against said first or second tracking sections in a direction to create a resultant force lying in said predetermined plane and extending through the position of engagement of the cam member with the cam follower.

7. A cam-cam follower system according to claim 6 wherein:
   a. said cam member is an annular structure with said first and second surfaces being closed curves; and
   b. said first curved surface of the cam member faces inwardly of the curve while the second surface faces outwardly.

8. A cam-cam follower system according to claim 7 wherein:
   a. said cam follower includes a rotatable wheel; and
   b. said drive means includes means for driving said wheel.

9. A cam-cam follower system according to claim 8 wherein:
   a. said guide follower members comprise follower wheels rotatably mounted with their axes of rotation lying in one plane extending perpendicular to said predetermined plane.

* * * * *